United States Patent
Yu et al.

(10) Patent No.: US 9,875,411 B2
(45) Date of Patent: Jan. 23, 2018

(54) VIDEO MONITORING METHOD, VIDEO MONITORING APPARATUS AND VIDEO MONITORING SYSTEM

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Gang Yu, Beijing (CN); Chao Li, Beijing (CN); Qizheng He, Beijing (CN); Qi Yin, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 99 days.

(21) Appl. No.: 14/982,998

(22) Filed: Dec. 29, 2015

(65) Prior Publication Data

US 2017/0039431 A1    Feb. 9, 2017

(30) Foreign Application Priority Data

Aug. 3, 2015    (CN) ............. 2015 1 048324

(51) Int. Cl.
   *G06K 9/00*    (2006.01)
   *G06T 7/277*    (2017.01)
(52) U.S. Cl.
   CPC .......... *G06K 9/00771* (2013.01); *G06T 7/277* (2017.01); *G06T 2207/10016* (2013.01); *G06T 2207/10028* (2013.01)

(58) Field of Classification Search
   CPC .......... G06K 9/00342; G06K 9/00369; G06K 9/00624; G06K 9/00744; G06K 9/00771; G06K 9/00778; G06K 9/62; G06K 9/6202; G06K 9/6218; G06K 2009/00738; G06T 5/20; G06T 7/20; G06T 7/277; G06T 7/50; G06T 7/73; G06T 7/194; G06T 7/246; G06T 2207/10016; G06T 2207/10028; G06T 2207/30196; G06T 2207/30232; G06T 2207/30242; H04N 13/0264; G07C 11/00; G07C 9/00; G07C 2011/04
   See application file for complete search history.

(56) References Cited

U.S. PATENT DOCUMENTS 7,003,136 B1 *  2/2006  Harville ............. G06K 9/00201
                                                       348/169
7,623,676 B2 * 11/2009  Zhao .................. G06K 9/00369
                                                       348/580

(Continued)

*Primary Examiner* — Jose Couso
(74) *Attorney, Agent, or Firm* — Hamre, Schumann, Mueller & Larson, P.C.

(57) ABSTRACT

The present disclosure relates to a video monitoring method and a video monitoring system based on a depth video. The video monitoring method comprises: obtaining video data collected by a video collecting module; determining an object as a monitored target based on pre-set scene information and the video data; extracting characteristic information of the object; and determining predictive information of the object based on the characteristic information, wherein the video data comprises video data including the depth information.

24 Claims, 11 Drawing Sheets

(56) References Cited

U.S. PATENT DOCUMENTS

| | | | |
|---|---|---|---|
| 7,706,571 B2* | 4/2010 | Das | G06K 9/00369 |
| | | | 382/103 |
| 8,098,888 B1* | 1/2012 | Mummareddy | G06K 9/00778 |
| | | | 382/103 |
| 9,270,952 B2* | 2/2016 | Jamtgaard | G01S 3/7864 |
| 2014/0347475 A1* | 11/2014 | Divakaran | G06K 9/00771 |
| | | | 348/135 |
| 2015/0294143 A1* | 10/2015 | Wells | G06K 9/00369 |
| | | | 348/159 |
| 2016/0275695 A1* | 9/2016 | Luczak | G06T 7/285 |
| 2016/0295196 A1* | 10/2016 | Finn | G06T 7/11 |
| 2017/0032194 A1* | 2/2017 | Yu | G06K 9/62 |

* cited by examiner

VIDEO MONITORING METHOD, VIDEO MONITORING APPARATUS AND VIDEO MONITORING SYSTEM

CROSS-REFERENCE TO RELATED APPLICATIONS

The present application claims the priority of a Chinese patent application No. 201510483241.0 filed on Aug. 3, 2015, the disclosure of which is incorporated herein by reference in its entirety.

TECHNICAL FIELD

The present disclosure relates to the field of video monitoring, and more particularly, to a video monitoring method and a video monitoring system based on a depth video.

BACKGROUND

In a scene having video monitor such as a station and a ticket office and so on, estimation of queuing time is performed mainly depending on the number of pedestrians in a current queue and a motion speed of each queue. However, it is very hard for a user to know in advance the motion speed of each queue during a previous time interval, so that a selection is always made only based on a queue length of each queue. In this way, it is always assumed that a processing speed of each queue is the same. However, in fact, processing efficiency of each queue may be quiet different due to different staff members. It is very hard to estimate an approximate waiting time only based on the queue length. If a waiting time of each current queue can be estimated according to video data automatically, then the waiting time of the user can be saved greatly and work efficiency can be raised.

Therefore, it is desired to provide a video monitoring method and a video monitoring system based on a depth video, which are capable of automatically intercepting the queue length in a physical space as well as the motion speed of the queue in a three-dimensional space based on the depth video, to estimate the queuing time of each queue successively. Then, a suggestion on a queue that a current user queues up is given to the user.

SUMMARY

The present disclosure is provided in view of the above problems. The present disclosure provides a video monitoring method and a video monitoring system based on a depth video.

According to an embodiment of the present disclosure, there is provided a video monitoring method, comprising: obtaining video data collected by a video collecting module; determining an object as a monitored target based on pre-set scene information and the video data; extracting characteristic information of the object; and determining predictive information of the object based on the characteristic information, wherein the video data comprises video data including the depth information.

Further, the video monitoring method according to an embodiment of the present disclosure further comprises: configuring the video collecting module and determining coordinate parameters of the video collecting module.

Further, in the video monitoring method according to an embodiment of the present disclosure, determining coordinate parameters of the video collecting module comprises: selecting multiple reference points on a predetermined reference plane; determining a transformation relationship of a camera coordinate system of the video collecting module and a world coordinate system based on coordinate information of the multiple reference points; and determining the coordinate parameters of the video collecting module based on the transformation relationship.

Further, in the video monitoring method according to an embodiment the present disclosure, the pre-set scene information comprises background depth information of a background region of a monitored scene.

Further, in the video monitoring method according to an embodiment of the present disclosure, determining an object as a monitored target based on preset scene information and the video data comprises: obtaining a depth information difference between current depth information of each pixel point of the video data and corresponding background depth information, and determining a region comprising a pixel point whose depth information difference is greater than a first predetermined threshold as a foreground candidate region; and performing median filtering on video data of the foreground candidate region to obtain video data of a foreground region to be monitored.

Further, in the video monitoring method according to an embodiment of the present disclosure, determining an object as a monitored target further comprises: removing a noise region where the number of pixel points included is less than a second predetermined threshold from the foreground region to be monitored to obtain a plurality of first foreground sub-regions; determining a space between each of the plurality of first foreground sub-regions in a first predetermined direction; and connecting respective first foreground sub-regions whose space is smaller than a third predetermined threshold in the first predetermined direction to obtain a plurality of second foreground sub-regions as a plurality of objects.

Further, in the video monitoring method according to an embodiment of the present disclosure, extracting characteristic information of the object comprises: determining a second direction of the object in the monitored scene based on the video data of the object; determining a first end point and a second end point of the object in the second direction; and determining a length between the first end point and the second end point based on the transformation relationship.

Further, in the video monitoring method according to an embodiment of the present disclosure, extracting characteristic information of the object further comprises: selecting a predetermined point in the object, and tracking motion of the predetermined point based on the video data; and determining a motion speed of the predetermined point in the second direction as a motion speed of the object.

Further, in the video monitoring method according to an embodiment of the present disclosure, extracting characteristic information of the object further comprises: selecting multiple predetermined points in the object, and determining an average value of motion speeds of the multiple predetermined points in the second direction as a motion speed of the object; and determining the motion speeds of the object at a plurality of predetermined time intervals continuously to obtain a probability distribution of the motion speeds of the object.

Further, in the video monitoring method according to an embodiment of the present disclosure, determining predictive information of the object based on the characteristic information comprises: based on a length and the motion speed of each of the plurality of objects, determining an average waiting time required for moving from the second end point to the first end point as predictive information of each of the plurality of objects.

Further, in the video monitoring method according to an embodiment of the present disclosure, determining predictive information of the object based on the characteristic information further comprises: based on the probability distribution of the motion speeds, subtracting a triple standard deviation of the motion speed by the average value of the motion speed as a slowest motion speed; and based on the length and the slowest motion speed of each of the plurality of objects, determining a longest waiting time required for moving from the second end point to the first end point as the predictive information of each of the plurality of objects.

According to another embodiment of the present disclosure, there is provided a video monitoring system, comprising: a video collecting module configured to collect video data; and a video monitoring module configured to perform monitoring based on the video data, comprising: an object determining unit configured to determine an object as a monitored target based on pre-set scene information and the video data; a characteristic information extracting unit configured to extract characteristic information of the object; and a predictive information determining unit configured to determine predictive information of the object based on the characteristic information, wherein the video data comprises video data including the depth information.

Further, in the video monitoring system according to the embodiment of the present disclosure, the video monitoring module configures the video collecting module and determines coordinate parameters of the video collecting module.

Further, in the video monitoring system according to the embodiment of the present disclosure, determining coordinate parameters of the video collecting module by the video monitoring module comprises: selecting multiple reference points on a predetermined reference plane; determining a transformation relationship of a camera coordinate system of the video collecting module and a world coordinate system based on coordinate information of the multiple reference points; and determining the coordinate parameters of the video collecting module based on the transformation relationship.

Further, in the video monitoring system according to another embodiment the present disclosure, the pre-set scene information comprises background depth information of a background region of a monitored scene.

Further, in the video monitoring system according to another embodiment of the present disclosure, the object determining unit obtains a depth information difference between current depth information of each pixel point of the video data and corresponding background depth information, determines a region comprising a pixel point whose depth information difference is greater than a first predetermined threshold as a foreground candidate region; and performs median filtering on video data of the foreground candidate region to obtain video data of a foreground region to be monitored.

Further, in the video monitoring system according to another embodiment of the present disclosure, the object determining unit removes a noise region where the number of pixel points included is less than a second predetermined threshold from the foreground region to be monitored to obtain a plurality of first foreground sub-regions; determines a space between each of the plurality of first foreground sub-regions in a first predetermined direction, and connects, in the first predetermined direction, respective first foreground sub-regions whose space is smaller than a third predetermined threshold, to obtain a plurality of second foreground sub-regions as a plurality of objects.

Further, in the video monitoring system according to another embodiment of the present disclosure, the characteristic information extracting unit determines a second direction of the object in the monitored scene based on the video data of the object; determines a first end point and a second end point of the object in the second direction; and determines a length between the first end point and the second end point based on the transformation relationship.

Further, in the video monitoring system according to another embodiment of the present disclosure, the characteristic information extracting unit selects a predetermined point in the object, and tracks motion of the predetermined point based on the video data; and determines a motion speed of the predetermined point in the second direction as a motion speed of the object.

Further, in the video monitoring system according to another embodiment of the present disclosure, the characteristic information extracting unit selects multiple predetermined points in the object, and determines an average value of motion speeds of the multiple predetermined points in the second direction as an average motion speed of the object; and determines the motion speeds of the object at a plurality of predetermined time intervals continuously to obtain a probability distribution of the motion speeds of the object.

Further, in the video monitoring system according to another embodiment of the present disclosure, the predictive information determining unit determines an average waiting time required for moving from the second end point to the first end point as predictive information of each of the plurality of objects based on a length and the motion speed of each of the plurality of objects.

Further, in the video monitoring system according to another embodiment of the present disclosure, the predictive information determining unit subtracts a triple standard deviation of the motion speed by the average value of the motion speed as a slowest motion speed based on the probability distribution of the motion speeds; and determines a longest waiting time required for moving from the second end point to the first end point as the predictive information of each of the plurality of objects based on the length and the slowest motion speed of each of the plurality of objects.

According to another embodiment of the present disclosure, there is provided a computer program product, comprising a computer readable storage medium upon which computer program instructions are stored. The computer program instructions, when being executed by a computer, execute steps of: obtaining video data collected by a video collecting module; determining an object as a monitored target based on a pre-set scene information and the video data; extracting characteristic information of the object; and determining predictive information of the object based on the characteristic information, wherein the video data comprises video data including depth information.

It needs to be understood that both the above general description and the following detailed description are illustrative, and are intended to provide further explanation on the technologies to be claimed.

BRIEF DESCRIPTION OF THE DRAWINGS

The above and other objects, features and advantages of the present disclosure will become more apparent by more detailed descriptions of embodiments of the present disclosure in connection with figures. The figures are used to provide further understanding of embodiments of the present disclosure, constitute part of the specification, explain the present disclosure together with embodiments of the present disclosure, but not limit the present disclosure. In the figures, the same reference numbers usually represent the same elements or steps.

DETAILED DESCRIPTION

In order to make objects, technical solutions and advantages of the present disclosure more obvious, exemplary embodiments of the present disclosure will be described in detail with reference to the figures in the following. Obviously, the described embodiments are only part embodiments of the present disclosure, but not all the embodiments. It should be understood that the present disclosure is not limited by exemplary embodiments described herein. All other embodiments obtained by those skilled in the art based on the embodiments described in the present disclosure without creative work shall fall into the protection scope of the present disclosure.

In the following, preferable embodiments of the present disclosure will be described in detail with reference to the figures.

Figure 1:
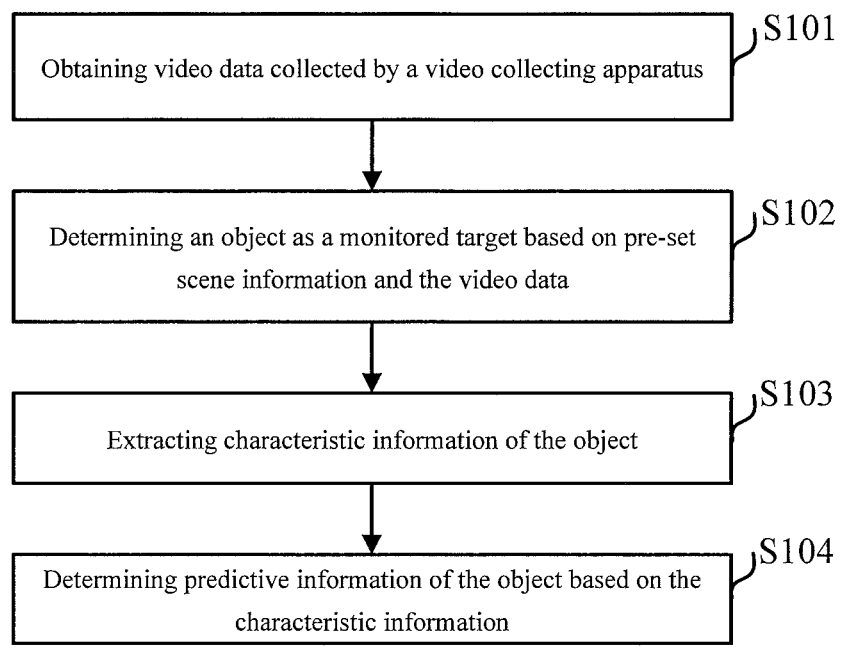
FIG. 1 is a flowchart illustrating a video monitoring method according to an embodiment of the present disclosure.

FIG. 1 is a flowchart illustrating a video monitoring method according to an embodiment of the present disclosure. As shown in FIG. 1, a video monitoring method according to an embodiment of the present disclosure comprises the following steps.

In step S101, video data collected by a video collecting apparatus is obtained. In an embodiment of the present disclosure, the video collecting module is a depth camera that is capable of obtaining depth video data of a subject to be captured. Obtaining video data collected by a video collecting module comprises, but is not limited to, receiving video data sent from the video collecting module via a wired or wireless manner after the video collecting module arranged separately in physical position collects the video data. Alternatively, the video collecting module can be physically located at the same position or even inside the same housing with other modules or components in the video monitoring system. Other modules or components in the video monitoring system receive video data sent from the video collecting module via an internal bus. Then, the process moves to step S102.

In step S102, an object as a monitored target is determined based on pre-set scene information and the video data. In an embodiment of the present disclosure, the object as the monitored target is a queue recorded in the video data. In particular, by using the depth video data obtained in step S101 and the pre-set scene information, each queue in line is split accurately in a three-dimensional physical world, and the split each queue in line is taken as a monitored target. The flow of how to determine the object as the monitored target will be further described in detail with reference to the figures in the following. Then, the process moves to step S103.

In step S103, characteristic information of the object is extracted. In an embodiment of the present disclosure, the characteristic information of the object includes but not limited to a length and a motion speed of the queue as the object. The flow of how to extract the characteristic information of the object will be further described in detail with reference to the figures in the following. Then, the process moves to step S104.

In step S104, predictive information of the object is determined based on the characteristic information. In an embodiment of the present disclosure, waiting time of respective queues is estimated based on the length and motion speed of the queue as the object determined in step S103, so as to provide suggestion for the user to queue up. The flow of how to determine the predictive information of the object will be further described in detail with reference to the figures in the following.

The video monitoring method according to the embodiment of the present disclosure adopts the depth camera as the video collecting module, automatically intercepts the length of the queue in the physical space and the motion speed of the queue in the three-dimensional space, and estimates the queuing time of each queue successively. In addition, the video monitoring method based on the depth video according to the embodiment of the present disclosure is capable of being not affected by shielding between different queues, and can update in real time the waiting time estimation of the queue according to the probability model of the motion speed of the queue in real time, based on information at the current moment.

A video monitoring system that performs the video monitoring method will be further described in detail with reference to FIG. 2 in the following.

Figure 2:
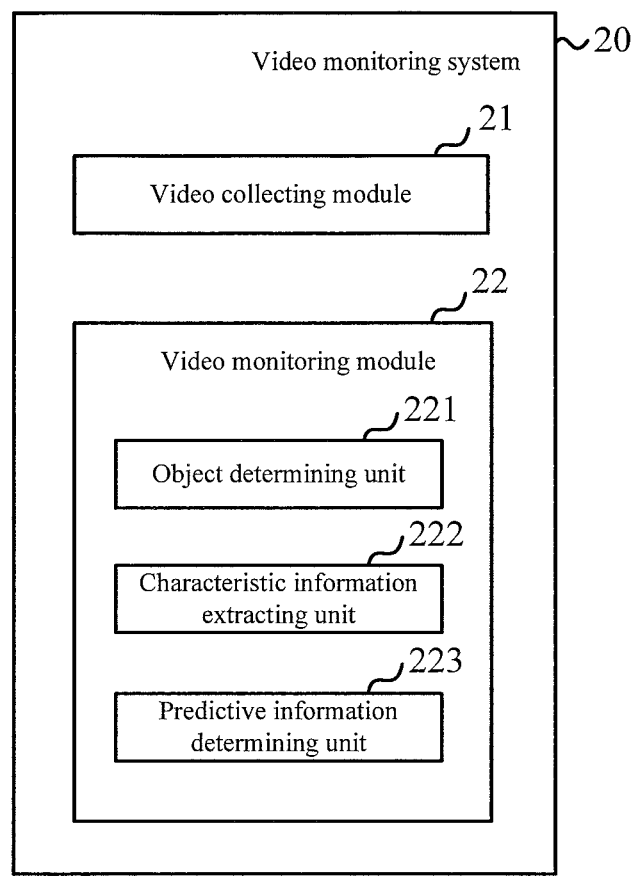
FIG. 2 is a functional block diagram illustrating a video monitoring system according to an embodiment of the present disclosure.

FIG. 2 is a functional block diagram illustrating a video monitoring system according to an embodiment of the present disclosure. As shown in FIG. 2, the video monitoring system 20 according to an embodiment of the present disclosure comprises a video collecting module 21 and a video monitoring module 22. The video monitoring module 22 further comprises an object determining unit 221, a characteristic information extracting unit 222 and a predictive information determining unit 223. The video collecting module 21 and the video monitoring module 22, and the object determining unit 221, the characteristic information extracting unit 222 and the predictive information determining unit 223 in the video monitoring module 22 can for example be configured by hardware (server, dedicated computer, or the like), software, firmware, or any suitable combination of the above.

In particular, the video collecting module 21 is configured to collect video data. In an embodiment of the present disclosure, the video collecting module 21 can comprise a video collecting apparatus of a depth camera that is capable of collecting depth information of a subject to be captured. The video collecting apparatus can be physically separated from, or physically located at the same position or even inside the same housing with the subsequent video monitoring module 22. In the case that the video collecting apparatus is physically separated from the subsequent video monitoring module 22, the video collecting module 21 further transmits the depth video data obtained by the video collecting apparatus to the subsequent modules via a wired or wireless manner. In the case that the video collecting apparatus is physically located at the same position or even inside the same housing with the subsequent video monitoring module 22, the video collecting module 21 transmits the depth video data obtained by the video collecting apparatus to the subsequent modules via an internal bus. The video data can comprise depth video data and chromatic video data. More particularly, a three-dimensional position parameter of each pixel in the video data can be determined according to the position parameter of the video collecting apparatus and the depth information value of each pixel point in the video data. Before transmitting via a wired or wireless manner or via an internal bus, the video data can be encoded and compressed into a video data packet in a predetermined format to reduce amount of traffic and bandwidth needing to be occupied by the transmission.

The video monitoring module 22 is configured to perform monitoring based on the video data. In particular, the object determining unit 221 is configured to determine the object as the monitored target based on the pre-set scene information and the video data. In an embodiment of the present disclosure, the object determining unit 221 utilizes the depth video data obtained by the video collecting module 21 and the pre-set scene information to split each queue in line in a three-dimensionally physical world accurately, and takes the split each queue in line as the monitored target.

The characteristic information extracting unit 222 is configured to extract the characteristic information of the object. In an embodiment of the present disclosure, the characteristic information extracting unit 222 extracts a length and a motion speed of the each queue in line split by the object determining unit 221.

The predictive information determining unit 223 is configured to determine the predictive information of the object based on the characteristic information. In an embodiment of the present disclosure, the predictive information determining unit 223 estimates the waiting time of each queue based on the length and the motion speed of the each queue in line extracted by the characteristic information extracting unit 222, so as to provide suggestion for the user to queue up.

Respective specific step flows of the video monitoring method according to the embodiment of the present disclosure executed by respective modules of the video monitoring system according to the embodiment of the present disclosure will be further described in detail with reference to the figures in the following.

Figure 3:
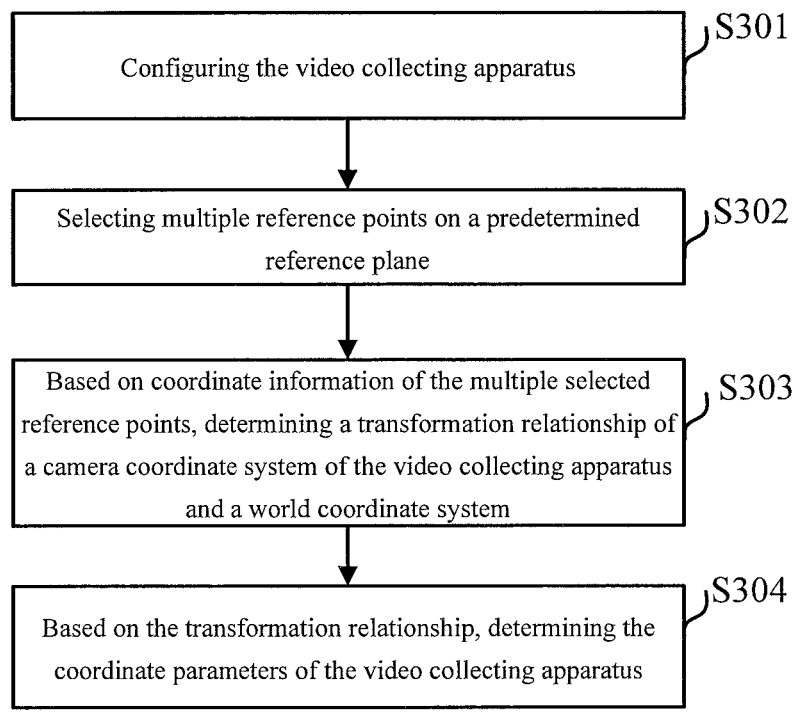
FIG. 3 is a flowchart further illustrating configuration and determination of a parameter of a video collecting apparatus in a video monitoring method according to an embodiment of the present disclosure.
Figure 4:
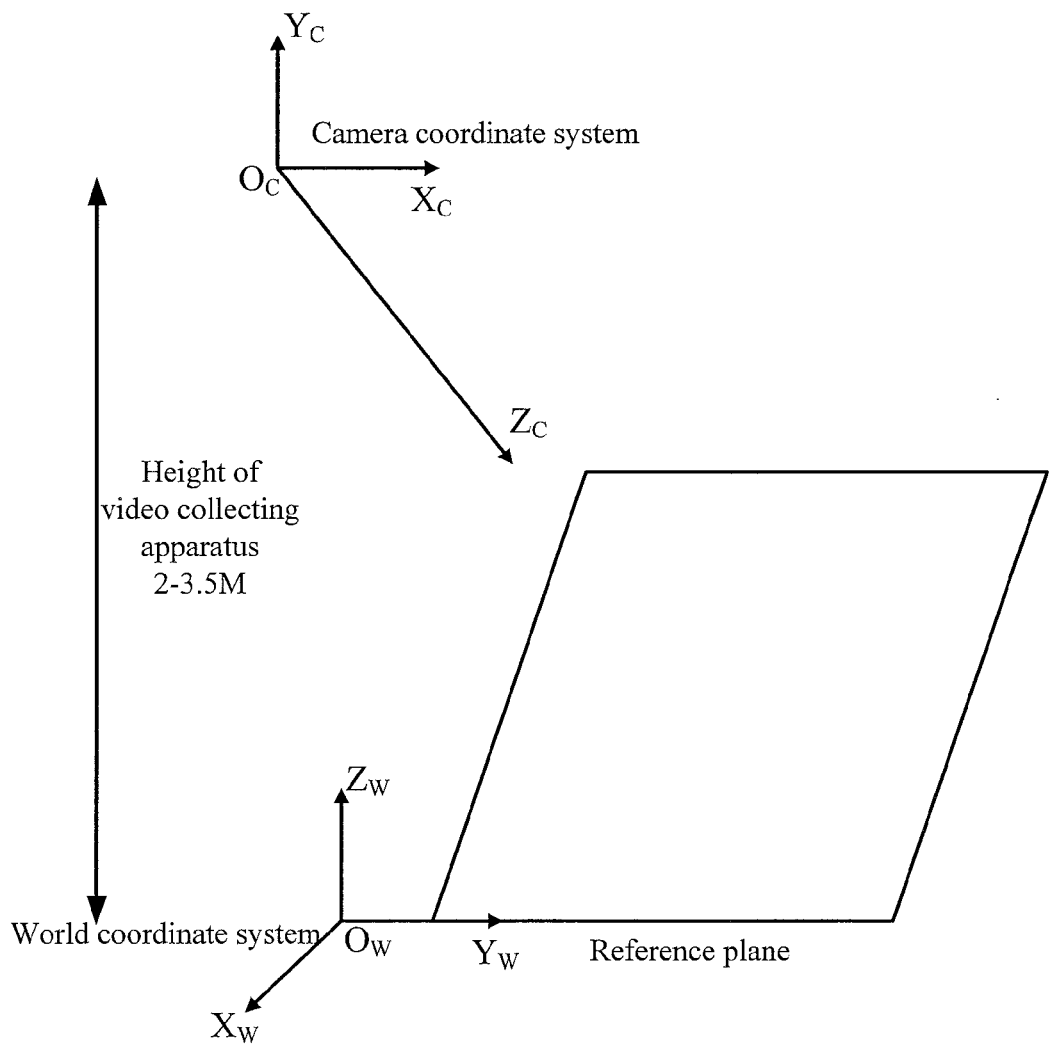
FIG. 4 is a schematic diagram illustrating a camera coordinate system and a world coordinate system used to determine parameters of a video collecting apparatus.

First, configuration of the video collecting apparatus and determination of coordinate parameters of the video collecting apparatus are described by referring to FIGS. 3 and 4. The configuration of the video collecting apparatus and the determination of the coordinate parameters of the video collecting apparatus can be controlled and performed by the video collecting module 21. FIG. 3 is a flowchart further illustrating configuration and determination parameters of a video collecting apparatus in a video monitoring method according to an embodiment of the present disclosure. FIG. 4 is a schematic diagram illustrating a camera coordinate system and a world coordinate system used to determine the parameters of the video collecting apparatus.

As shown in FIG. 3, the process flow of configuring and determining the parameters of the video collecting apparatus in the video monitoring method according to the embodiment of the present disclosure comprises the following steps.

In step S301, the video collecting apparatus is configured. A depth camera as the video collecting apparatus is installed in a scene to be monitored. Generally, the depth camera is installed at a height of 2-3.5 meters, and its perspective is looking down upon the ground (as shown schematically in FIG. 4). Herein, the video collecting apparatus can be a single depth camera (i.e., there are only depth camera lens) or a depth chromatic twin-lens camera. In the case of the depth chromatic twin-lens camera, the camera needs to be calibrated, so that images obtained from the two lenses are corresponding to and synchronized with each other. Then, the process moves to step S302. As a result, for the installed video collecting apparatus, its coordinate parameters such as the actual height being away from the reference plane and the perspective and so on are determined.

In step S302, multiple reference points on a predetermined reference plane are selected. As shown in FIG. 4, the predetermined reference plane can be a ground plane. The greater of the number (for example, greater than or equal to 5) of selected reference points is, the higher the accuracy is. Then, the process moves to step S303.

In step S303, based on coordinate information of the multiple selected reference points, a transformation relationship of a camera coordinate system of the video collecting apparatus and a world coordinate system is determined. As shown in FIG. 4, a rectangular coordinate system constituted of a point Oc and axes Xc, Yc, and Zc is the camera coordinate system. In order to describe the position of the camera, the world coordinate system is introduced. The rectangular coordinate system constituted of a point Ow and axes Xw, Yw, and Xw is the world coordinate system. A transformation matrix from the camera coordinate system to the world coordinate system, i.e., the transformation relationship of the camera coordinate system and the world coordinate system, can be estimated based on the least square method by selecting the multiple reference points. Then, the process moves to step S304.

In step S304, based on the transformation relationship, the coordinate parameters of the video collecting apparatus are determined. By transforming the camera coordinate system into the world coordinate system with the transformation relationship, the coordinate parameters of the actual height and perspective of the video collecting apparatus can be determined. Likewise, by transforming the pixel points in the video collected by the video collecting apparatus into the world coordinate system, a position of the complete ground plane in the video scene can be determined.

Figure 5:
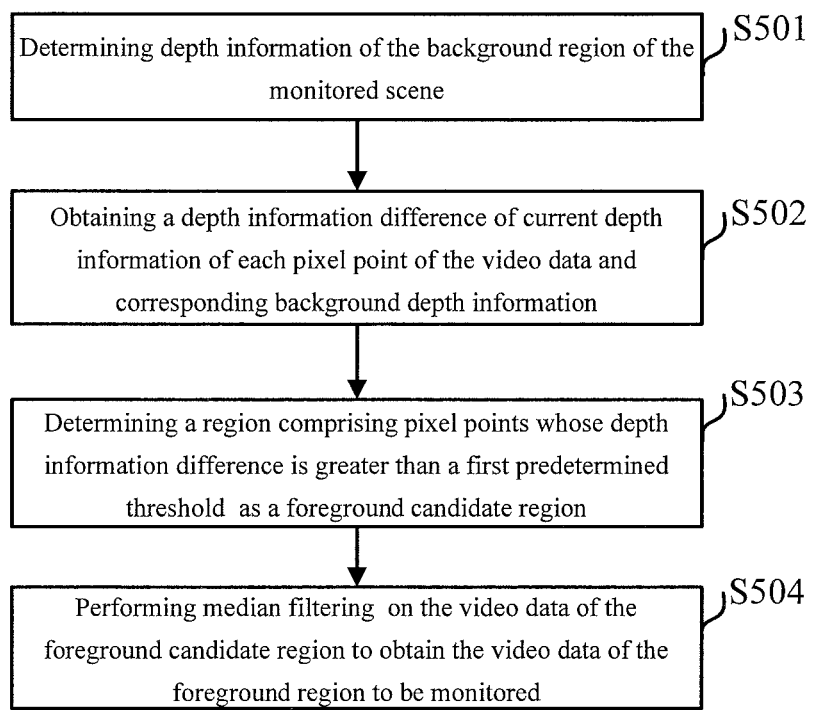
FIG. 5 is a flowchart further illustrating determination of a foreground region to be monitored in a video monitoring method according to an embodiment of the present disclosure.
Figure 6:
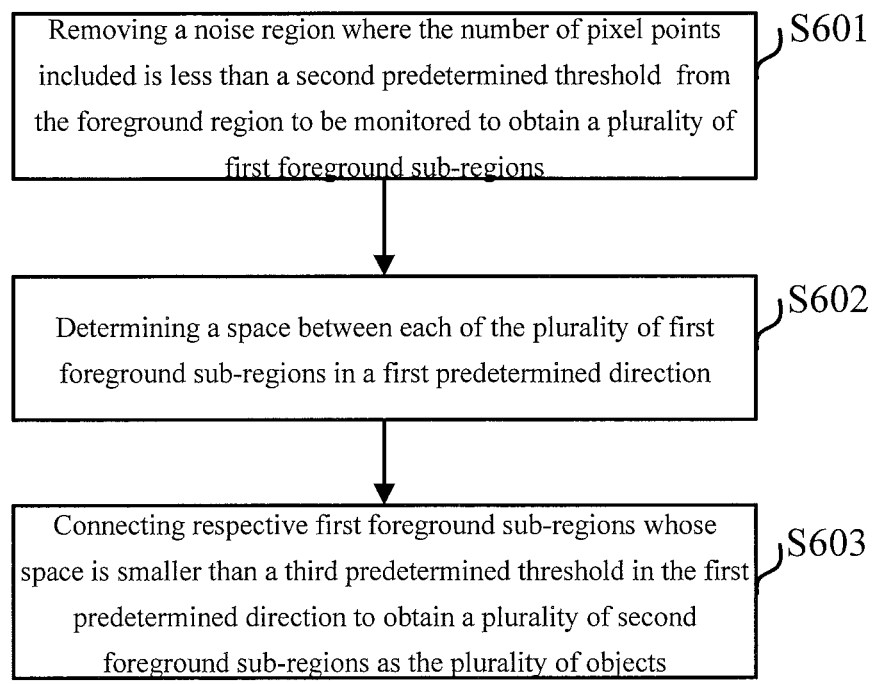
FIG. 6 is a flowchart further illustrating determination of a plurality of objects to be monitored in a video monitoring method according to an embodiment of the present disclosure.

Determination of the object as the monitored target will be described with reference to FIGS. 5 to 7 in the following. The determination of the object as the monitored target can be controlled and performed by the object determining unit 221. FIG. 5 is a flowchart further illustrating determination of a foreground region to be monitored in a video monitoring method according to an embodiment of the present disclosure. FIG. 6 is a flowchart further illustrating determination of a plurality of objects to be monitored in a video monitoring method according to an embodiment of the present disclosure. FIG. 7 is a schematic diagram illustrating determination of a plurality of objects to be monitored in a video monitoring method according to an embodiment of the present disclosure.

As shown in FIG. 5, the process flow of determining the foreground region to be monitored in the video monitoring method according to the embodiment of the present disclosure comprises the following steps.

In step S501, background depth information of the background region of the monitored scene is determined. In an embodiment of the present disclosure, in the case that there exists no object in the monitored scene, depth information of each position in the monitored scene captured by the video monitoring module 22 at this time is obtained and saved as a matrix $D(x, y)$, which represents a background depth value at each position with an image coordinate $(x, y)$. Then, the process moves to step S502.

In step S502, a depth information difference of current depth information of each pixel point of the video data and corresponding background depth information is obtained. In an embodiment of the present disclosure, a current depth value $C(x, y)$ of each pixel position in a monitored scene captured by the video monitoring module 22 in real time is obtained, so as to calculate a depth information difference of each pixel position in the image space $\Delta D=C(x,y)-D(x,y)$. Then, the process moves to step S503.

In step S503, a region comprising pixel points whose depth information difference is greater than a first predetermined threshold is determined as a foreground candidate region. In an embodiment of the present disclosure, a region comprising pixel points whose depth information difference $\Delta D$ is greater than a first predetermined threshold T1 is selected as the foreground candidate region. Then, the process moves to step S504.

In step S504, median filtering is performed on the video data of the foreground candidate region to obtain the video data of the foreground region to be monitored. In an embodiment of the present disclosure, by performing median filtering on the video data of the foreground candidate region, filtering noise signals can be realized, and at the same time edge of signals can be protected, so that the foreground region is not blurred.

After the foreground region is determined through the process flow in FIG. 5, the plurality of objects to be monitored in the foreground region starts to be determined. As shown in FIG. 6, the process flow of determining the plurality of objects to be monitored in the video monitoring method according to the embodiment of the present disclosure comprises the following steps.

In step S601, a noise region where the number of pixel points included is less than a second predetermined threshold is removed from the foreground region to be monitored to obtain a plurality of first foreground sub-regions. In an embodiment of the present disclosure, a region where the number of the pixel points included is less than a second predetermined threshold T2 is determined as a noise region instead of a queue, and a plurality of first foreground sub-regions are obtained after the noise region is removed from the foreground region to be monitored. Then, the process moves to step S602.

In step S602, a space between each of the plurality of first foreground sub-regions in a first predetermined direction is determined. In an embodiment of the present disclosure, the first predetermined direction is determined according to the situation of the monitored scene. The first predetermined direction is a possible orientation of the queue in the monitored scene. For example, according to the position and direction of a counter in the monitored scene, a direction vertical to the counter is determined as the first predetermined direction. Then, the process moves to step S603.

In step S603, respective first foreground sub-regions whose space is smaller than a third predetermined threshold are connected in the first predetermined direction to obtain a plurality of second foreground sub-regions as the plurality of objects. In an embodiment of the present disclosure, the respective first foreground sub-regions whose space is smaller than a third predetermined threshold T3 in the first predetermined direction may belong to a same queue, although the space between individuals who are queuing in the line is a little greater. Therefore, in order to determine a queue in line, the respective first foreground sub-regions whose space is smaller than the third predetermined threshold are connected in the first determined direction so as to obtain a plurality of second foreground sub-regions, that is, multiple complete queues are obtained as the plurality of objects for the subsequent characteristic extraction and queuing time estimation.

Figure 7A:
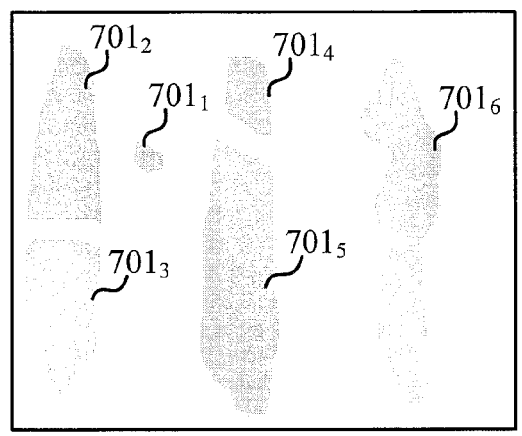
FIGS. 7A to 7C are schematic diagrams illustrating determination of a plurality of objects to be monitored in a video monitoring method according to an embodiment of the present disclosure.
Figure 7B:
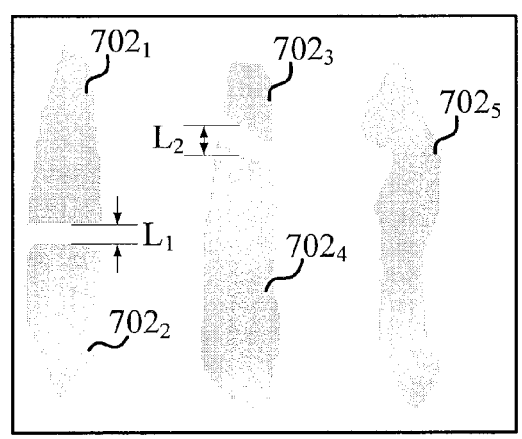
Figure 7C:
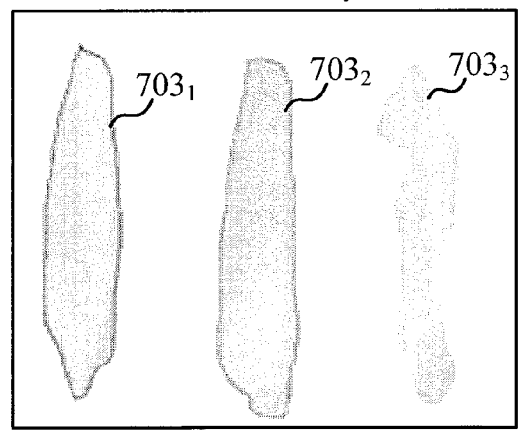

FIGS. 7A-7C specifically illustrate schematic diagrams of the process of obtaining the plurality of objects to be monitored through the process flow of determining the plurality of objects to be monitored as shown in FIG. 6.

First, as shown in FIG. 7A, after the foreground region is determined through the process flow in FIG. 5, there exists a plurality of foreground sub-regions $701_1$ to $701_6$.

Then, the noise region where the number of the pixel points is less than the second predetermined threshold T2 is removed from the plurality of foreground sub-regions $701_1$ to $701_6$ as shown in FIG. 7A. In particular, the foreground sub-region $701_1$ is removed as shown in FIG. 7B, so that the plurality of first foreground sub-regions $702_1$ to $702_5$ are remained.

Then, in the plurality of first foreground sub-regions $702_1$ to $702_5$ as shown in FIG. 7B, the space between each of the plurality of first foreground regions in the first predetermined direction is determined. In particular, a space $L_1$ between the first foreground sub-regions $702_1$ to $702_2$ in the first predetermined direction and a space $L_2$ between the first foreground sub-regions $702_3$ to $702_4$ in the first predetermined direction are determined. Herein, the spaces $L_1$ and $L_2$ both are smaller than the third predetermined threshold T3, so that the first foreground sub-regions $702_1$ to $702_2$ and the first foreground sub-regions $702_3$ to $702_4$ whose space is smaller than the third predetermined threshold T3 are connected in the first predetermined direction.

Finally, a plurality of second foreground sub-regions $703_1$ to $703_3$ as shown in FIG. 7C are obtained as the plurality of objects, that is, queues in lines in the monitored scene.

Figure 8:
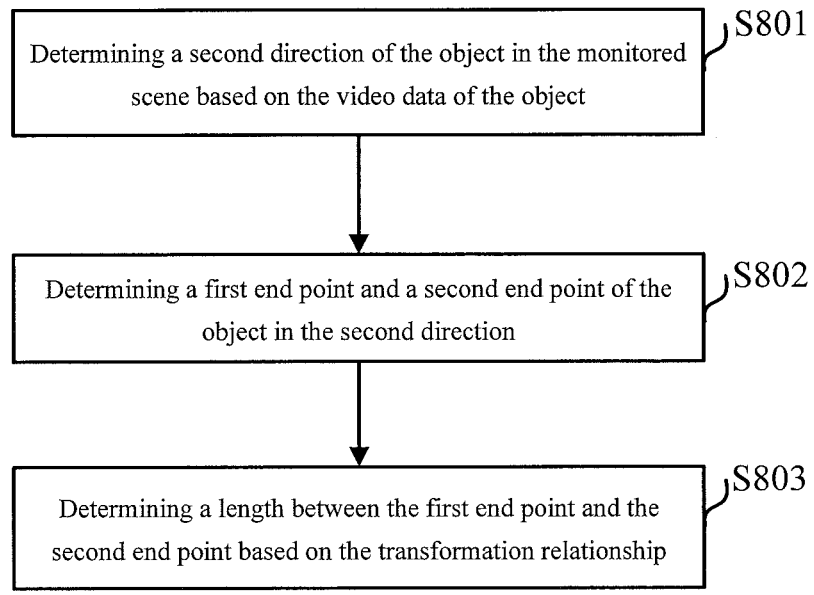
FIG. 8 is a flowchart further illustrating determination of a queue length in a video monitoring method according to an embodiment of the present disclosure.
Figure 9:
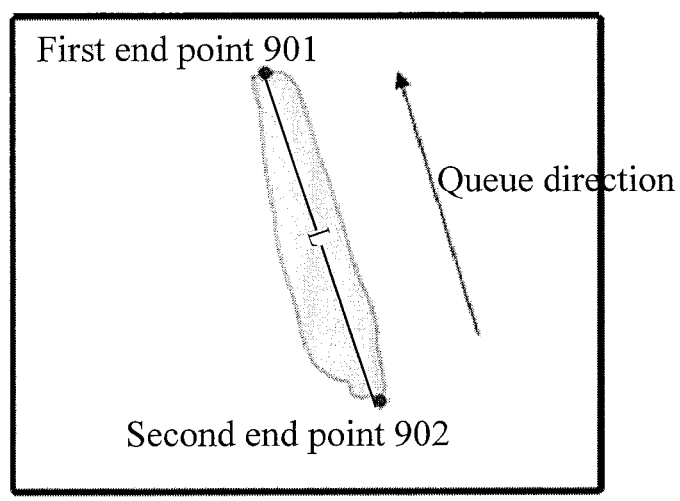
FIG. 9 is a schematic diagram illustrating determination of a queue length in a video monitoring method according to an embodiment of the present disclosure.
Figure 10:
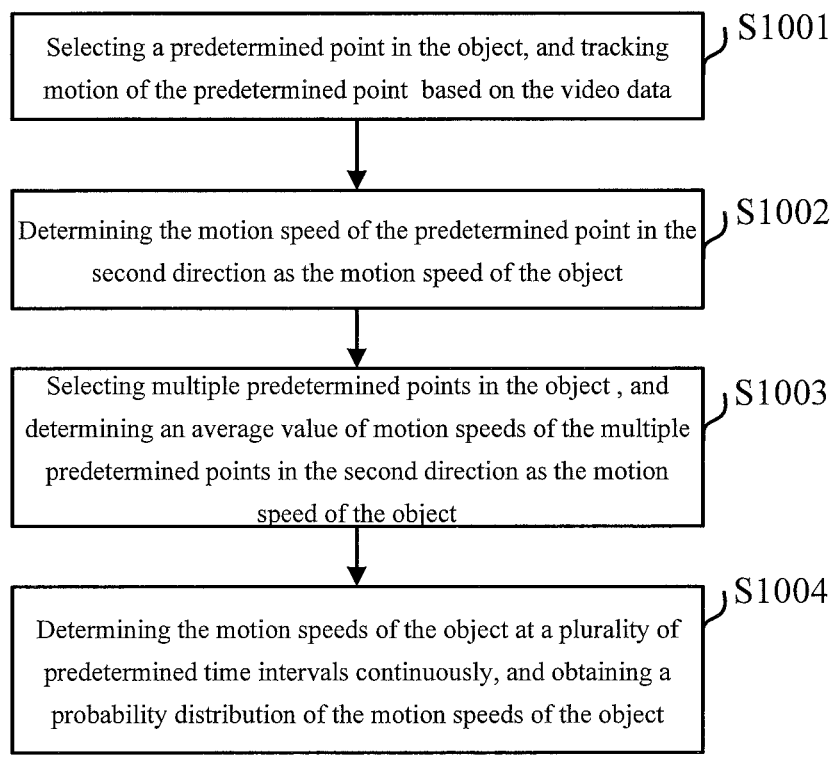
FIG. 10 is a flowchart further illustrating determination of a motion speed of a queue in a video monitoring method according to an embodiment of the present disclosure.

Extraction of characteristic information of the object as the monitored target will be described in detail with reference FIGS. 8 to 10 in the following. FIG. 8 is a flowchart further illustrating determination of a queue length in a video monitoring method according to an embodiment of the present disclosure. FIG. 9 is a schematic diagram illustrating determination of a queue length in a video monitoring method according to an embodiment of the present disclosure. FIG. 10 is a flowchart further illustrating determination of a motion speed of a queue in a video monitoring method according to an embodiment of the present disclosure.

After the plurality of second foreground sub-regions are determined as the plurality of objects (queues) through the process flow as shown in FIG. 6, a length of each queue is determined through the process flow as shown in FIG. 8.

In step S801, a second direction of the object in the monitored scene is determined based on the video data of the object. In an embodiment of the present disclosure, according to the video data of each queue, a direction of each queue can be obtained according Principal Component Analysis (PCA), indicating the second direction of the object in the monitored scene. The second direction may be the same as the first predetermined direction. Or, the second direction may be different from the first predetermined direction. For example, motion relative to the predetermined queuing direction in the process of queuing may occur. In the schematic diagram as shown in FIG. 9, the queue direction indicated by the arrow is determined. Then, the process moves to step S802.

In step S802, a first end point and second end point of the object in the second direction are determined. In the schematic diagram as shown in FIG. 9, a first end point 901 and a second end point 902 are determined. Then, the process moves to step S803.

In step S803, a length between the first end point and the second end point is determined based on the transformation relationship. In an embodiment of the present disclosure, based on the transformation relationship described with reference to FIGS. 3 and 4, a starting point of the queue and an ending point of the queue can be transformed from the image space into the three-dimensionally physical space, so that a physical length of the queue is calculated according to a distance between the starting point and the ending point in the three-dimensional space. In the schematic diagram as shown in FIG. 9, a length L between the first end point 901 and the second end point 902 is determined as a queue length of the queue.

After the length of each queue is determined through the process flow as shown in FIG. 8, the motion speed of each queue is determined through the process flow as shown in FIG. 10.

In step S1001, a predetermined point in the object is selected, and motion of the predetermined point is tracked based on the video data. In an embodiment of the present disclosure, some corner points can be found in the queue, then these corner points are tracked using an optical flow algorithm. Then, the process moves to step S1002.

In step S1002, the motion speed of the predetermined point in the second direction is determined as the motion speed of the object. In an embodiment of the present disclosure, motion of the predetermined point in the three-dimensional space is obtained, and the direction of the motion is projected into the second direction (i.e., the direction of the queue), so that the motion speed of the queue can be calculated. Then, the process moves to step S1003.

In step S1003, multiple predetermined points in the object are selected, and an average value of motion speeds of the multiple predetermined points in the second direction are determined as the motion speed of the object. In an embodiment of the present disclosure, in order to increase robustness of determination, a plurality of predetermined points can be selected in the queue, then the calculated results of the motion speeds of the plurality of predetermined points are averaged, and the average value is taken as the motion speed of the object. Then, the process moves to step S1004.

In step S1004, the motion speeds of the object at a plurality of predetermined time intervals are determined continuously, and a probability distribution of the motion speeds of the object is obtained. In an embodiment of the present disclosure, the motion speed of the queue is calculated at every predetermined time interval (for example, 1 second), then a Gaussian distribution is fit according to the data at the plurality of time intervals. In one embodiment, the motion speed of the queue can be calculated at each time interval using step S1003. The motion speed of the queue is modeled by using this Gaussian distribution.

Figure 11:
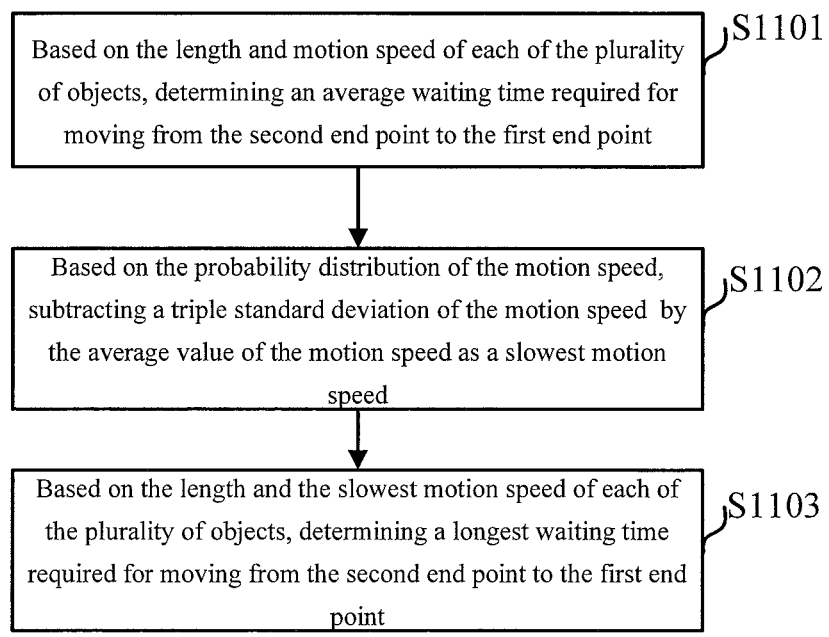
FIG. 11 is a flowchart further illustrating estimation of queuing time in a video monitoring method according to an embodiment of the present disclosure.

Estimation of queuing time of the queue of the object as the monitored target will be described with reference to FIG. 11 as following. FIG. 11 is a flowchart further illustrates estimation of queuing time in a video monitoring method according to an embodiment of the present disclosure.

After the characteristic information of the object as the monitored target is obtained through the process flows in FIGS. 8-10, the queuing time for the queue is estimated through the process flow as shown in FIG. 11.

In step 1101, based on the length and motion speed of each of the plurality of objects (queues), an average waiting time required for moving from the second end point to the first end point is determined. In an embodiment of the present disclosure, based on the length of each of the plurality of objects determined through the process flow as shown in FIG. 8 and the motion speed of each of the plurality of objects determined by the process flow as shown in FIG. 10, the queuing time of each object (queue) is estimated. In one embodiment, based on the distribution of the motion speeds determined through the process flow as shown in FIG. 10, an average value of the motion speeds can be determined and the average value can be taken as an average motion speed of the queue. And based on the length and the average motion speed which is determined based on the motion speed of each queue, the average waiting time can be estimated. Then, the process moves to step S1102.

In step S1102, based on the probability distribution of the motion speeds, a triple standard deviation of the motion speed is subtracted by the average value of the motion speed as a slowest motion speed. In an embodiment of the present disclosure, in order to estimate the slowest motion situation that may occur, based on the probability distribution of the motion speeds determined through the process flow as shown in FIG. 10, a standard deviation and the average value of the speed motion can be determined. And the triple standard deviation of the motion speed is subtracted from the average value of the motion speed and the result of the subtraction can be regarded as the slowest motion speed. Then, the process moves to step S1103.

In step 1103, based on the length and the slowest motion speed of each of the plurality of objects, a longest waiting time required for moving from the second end point to the first end point is determined.

After the average queuing time and the longest waiting time of each object (queue) are estimated through the process flow as shown in FIG. 11, the waiting time information can be provided to the user, so as to provide suggestion for the user to queue up. In addition, in the video monitoring method and the video monitoring system according to the embodiments of the present disclosure, according to the information at the present moment, estimation of the waiting time of the queue can be updated in real time according to the probability model of the motion speed of the queue in real time. Exemplarily, the waiting time information can be provided to the user in a manner of displaying the expected waiting time (including but not limited to the average queuing time, the longest waiting time and so on) through a display screen of a place of business (such as a ticket office and so on), or through a mobile terminal (such as a mobile phone and so on) of the user.

Figure 12:
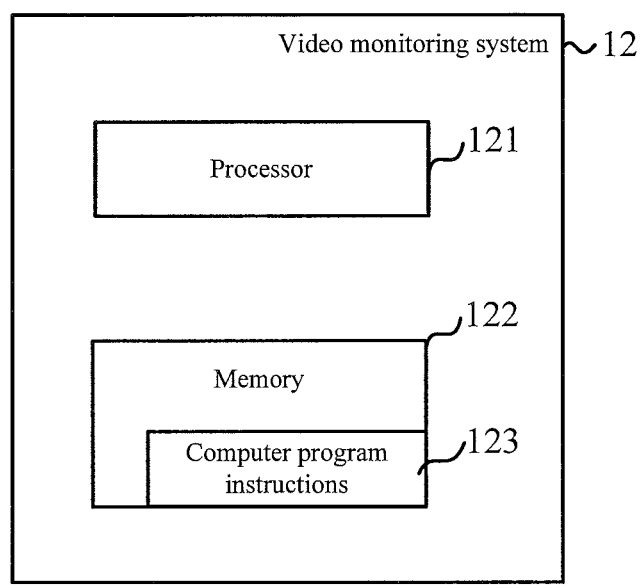
FIG. 12 is schematic block diagram illustrating a video monitoring system according to an embodiment of the present disclosure.

FIG. 12 is schematic block diagram illustrating a video monitoring system according to an embodiment of the present disclosure. As shown in FIG. 12, the video monitoring system according to the embodiment of the present disclosure comprises: a processor 121, a memory 122, and computer program instructions 123 stored in the memory 122.

The computer program instructions 123 can realize functions of each functional block of the video monitoring system according to an embodiment of the present disclosure and/or perform each step of the video monitoring method according to an embodiment of the present disclosure when executed by the processor 121.

In particular, the computer program instructions 123, when executed by the processor 121, perform steps of: obtaining video data collected by a video collecting module; determining an object as a monitored target based on pre-set scene information and the video data; extracting characteristic information of the object; and determining predictive information of the object based on the characteristic information, wherein the video data comprises video data including depth information.

Further, the computer program instructions 123, when executed by the processor 121, further perform steps of: configuring the video collecting module and determining coordinate parameters of the video collecting module.

Further, the step of determining coordinate parameters of the video collecting module performed by the computer program instructions 123 when executed by the processor 121 comprises: selecting multiple reference points on a predetermined reference plane; determining a transformation relationship of a camera coordinate system of the video collecting module and a world coordinate system based on coordinate information of the multiple reference points; and determining the coordinate parameters of the video collecting module based on the transformation relationship.

Further, the step of determining an object as a monitored target based on pre-set scene information and the video data performed by the computer program instructions 123 when executed by the processor 121 comprises: obtaining a depth information difference between current depth information of each pixel point of the video data and a corresponding background depth information, and determining a region comprising a pixel point whose depth information difference is greater than a first predetermined threshold as a foreground candidate region; and performing median filtering on video data of the foreground candidate region to obtain video data of a foreground region to be monitored.

Further, the step of determining an object as a monitored target perform red by the computer program instructions 123 when executed by the processor 121 comprises: removing a noise region where the number of pixel points included is less than a second predetermined threshold from the foreground region to be monitored to obtain a plurality of first foreground sub-regions; determining a space between each of the plurality of first foreground sub-regions in a first predetermined direction; and connecting respective first foreground sub-regions whose space is smaller than a third predetermined threshold in the first predetermined direction to obtain a plurality of second foreground sub-regions as a plurality of objects.

Further, the step of extracting characteristic information of the object performed by the computer program instructions 123 when executed by the processor 121 further comprises: determining a second direction of the object in the monitored scene based on the video data of the object; determining a first end point and a second end point of the object in the second direction; and determining a length between the first end point and the second end point based on the transformation relationship.

Further, the step of extracting characteristic information of the object performed by the computer program instructions 123 when executed by the processor 121 further comprises: selecting a predetermined point in the object, and tracking motion of the predetermined point based on the video data; and determining a motion speed of the predetermined point in the second direction as a motion speed of the object.

Further, the step of extracting characteristic information of the object performed by the computer program instructions 123 when executed by the processor 121 further comprises: selecting multiple predetermined points in the object, and determining an average value of motion speeds of the multiple predetermined points in the second direction as a motion speed of the object; and determining the motion speeds of the object at a plurality of predetermined time intervals continuously to obtain a probability distribution of the motion speeds of the object.

Further, the step of determining predictive information of the object based on the characteristic information performed by the computer program instructions 123 when executed by the processor 121 comprises: based on a length and the motion speed of each of the plurality of objects, determining an average waiting time required for moving from the second end point to the first end point as predictive information of each of the plurality of objects.

Further, the step of determining predictive information of the object based on the characteristic information performed by the computer program instructions 123 when executed by the processor 121 further comprises: based on the probability distribution of the motion speeds, subtracting a triple standard deviation of the motion speed by the average value of the motion speed as a slowest motion speed; and based on the length and the slowest motion speed of each of the plurality of objects, determining a longest waiting time required for moving from the second end point to the first end point as the predictive information of each of the plurality of objects.

Each module in the video monitoring system according to an embodiment of the present disclosure can be realized through the processor in the video monitoring system according to the embodiment of the present disclosure executing computer program instructions stored in the memory, or can be realized when computer instructions stored in the computer readable storage medium of a computer program product according to an embodiment of the present disclosure are executed by a computer.

The computer readable storage medium can be any combination of one or more computer readable storage media. For example, a computer readable storage medium comprises computer readable program codes for extracting characteristic information of the object, and another computer readable storage medium comprises computer readable program codes for determining predictive information of the object based on the characteristic information.

For example, the computer readable storage medium can include a storage card of a smart phone, a storage component of a pad computer, a hard drive of a personal computer, random access memory (RAM), read only memory (ROM), erasable programmable read only memory (EPROM), compact disk-read only memory (CD-ROM), USB memory, or any combination of the above storage media.

The above detailed exemplary embodiments of the present disclosure are only illustrative, but not limiting. Those skilled in the art should understand that various modifications, combinations or sub-combinations of those embodiments can be made without departing from the principle and spirit of the present disclosure, and such modifications should fall in the scope of the present disclosure.

What is claimed is:

1. A video monitoring method, comprising:
    obtaining video data collected by a video collecting module;
    determining an object as a monitored target based on pre-set scene information and the video data;
    extracting characteristic information of the object; and
    determining predictive information of the object based on the characteristic information, wherein the video data comprises video data including the depth information,
    wherein the pre-set scene information comprises background depth information of a background region of a monitored scene, and
    wherein determining an object as a monitored target based on preset scene information and the video data comprises:
        obtaining a depth information difference between current depth information of each pixel point of the video data and corresponding background depth information, and determining a region comprising a pixel point whose depth information difference is greater than a first predetermined threshold as a foreground candidate region; and
        performing median filtering on video data of the foreground candidate region to obtain video data of a foreground region to be monitored.

2. The video monitoring method according to claim 1, further comprising:
    configuring the video collecting module and determining coordinate parameters of the video collecting module,
    wherein determining coordinate parameters of the video collecting module comprises:
        selecting multiple reference points on a predetermined reference plane;
        determining a transformation relationship of a camera coordinate system of the video collecting module and a world coordinate system based on coordinate information of the multiple reference points; and
        determining the coordinate parameters of the video collecting module based on the transformation relationship.

3. The video monitoring method according to claim 2, wherein determining an object as a monitored target further comprises:
    removing a noise region where the number of pixel points included is less than a second predetermined threshold from the foreground region to be monitored, to obtain a plurality of first foreground sub-regions;
    determining a space between each of the plurality of first foreground sub-regions in a first predetermined direction; and
    connecting respective first foreground sub-regions whose space is smaller than a third predetermined threshold in the first predetermined direction, to obtain a plurality of second foreground sub-regions as a plurality of objects.

4. The video monitoring method according to claim 3, wherein extracting characteristic information of the object comprises:
    determining a second direction of the object in the monitored scene based on the video data of the object;
    determining a first end point and a second end point of the object in the second direction; and
    determining a length between the first end point and the second end point based on the transformation relationship.

5. The video monitoring method according to claim 4, wherein extracting characteristic information of the object further comprises:
    selecting a predetermined point in the object, and tracking motion of the predetermined point based on the video data; and
    determining a motion speed of the predetermined point in the second direction as a motion speed of the object.

6. The video monitoring method according to claim 5, wherein extracting characteristic information of the object further comprises:
    selecting multiple predetermined points in the object, and determining an average value of motion speeds of the multiples predetermined points in the second direction as a motion speed of the object; and
    determining the motion speeds of the object at a plurality of predetermined time intervals continuously to obtain a probability distribution of the motion speeds of the object.

7. The video monitoring method according to claim 6, wherein determining predictive information of the object based on the characteristic information comprises:
    based on a length and the motion speed of each of the plurality of objects, determining an average waiting time required for moving from the second end point to the first end point as predictive information of each of the plurality of objects.

8. The video monitoring method according to claim 7, wherein determining predictive information of the object based on the characteristic information further comprises:
    based on the probability distribution of the motion speeds, subtracting a triple standard deviation of the motion speed by the average value of the motion speed as a slowest motion speed; and
    based on the length and the slowest motion speed of each of the plurality of objects, determining a longest waiting time required for moving from the second end point to the first end point as the predictive information of each of the plurality of objects.

9. A video monitoring system, comprising:
    a video collecting module configured to collect video data; and
    a video monitoring module configured to perform monitoring based on the video data, and comprising:
        an object determining unit configured to determine an object as a monitored target based on pre-set scene information and the video data;
        a characteristic information extracting unit configured to extract characteristic information of the object; and
        a predictive information determining unit configured to determine predictive information of the object based on the characteristic information,
    wherein the video data comprises video data including the depth information, wherein the pre-set scene information comprises background depth information of a background region of a monitored scene, and wherein the object determining unit obtains a depth information difference between current depth information of each pixel point of the video data and corresponding background depth information, determines a region comprising a pixel point whose depth information difference is greater than a first predetermined threshold as a foreground candidate region, and performs median filtering on video data of the foreground candidate region to obtain video data of a foreground region to be monitored.

10. The video monitoring system according to claim 9, wherein the video monitoring module configures the video collecting module and determines coordinate parameters of the video collecting module, wherein determining coordinate parameters of the video collecting module by the video monitoring module comprises:

selecting multiple reference points on a predetermined reference plane;

determining a transformation relationship of a camera coordinate system of the video collecting module and a world coordinate system based on coordinate information of the multiple reference points; and determining the coordinate parameters of the video collecting module based on the transformation relationship.

11. The video monitoring system according to claim 10, wherein the object determining unit removes a noise region where the number of pixel points included is less than a second predetermined threshold from the foreground region to be monitored, to obtain a plurality of first foreground sub-regions;

determines a space between each of the plurality of first foreground sub-regions in a first predetermined direction; and connects, in the first predetermined direction, respective first foreground sub-regions whose space is smaller than a third predetermined threshold, to obtain a plurality of second foreground sub-regions as a plurality of objects.

12. The video monitoring system according to claim 11, wherein the characteristic information extracting unit determines a second direction of the object in the monitored scene based on the video data of the object;

determines a first end point and a second end point of the object in the second direction; and determines a length between the first end point and the second end point based on the transformation relationship.

13. The video monitoring system according to claim 12, wherein the characteristic information extracting unit selects a predetermined point in the object, and tracks motion of the predetermined point based on the video data; and determines a motion speed of the predetermined point in the second direction as a motion speed of the object.

14. The video monitoring system according to claim 13, wherein the characteristic information extracting unit selects multiple predetermined points in the object, and determines an average value of motion speeds of the multiple predetermined points in the second direction as a motion speed of the object; and determines the motion speeds of the object at a plurality of predetermined time intervals continuously to obtain a probability distribution of the motion speeds of the object.

15. The video monitoring system according to claim 14, wherein the predictive information determining unit determines an average waiting time required for moving from the second end point to the first end point as predictive information of each of the plurality of objects based on a length and the motion speed of each of the plurality of objects.

16. The video monitoring system according to claim 15, wherein the predictive information determining unit subtracts a triple standard deviation of the motion speed by the average value of the motion speed as a slowest motion speed based on the probability distribution of the motion speeds; and determines a longest waiting time required for moving from the second end point to the first end point as the predictive information of each of the plurality of objects based on the length and the slowest motion speed of each of the plurality of objects.

17. A video monitoring apparatus, comprising:

a processor;

a memory; and computer program instructions stored in the memory, when executed by the processor, performing steps of:

obtaining video data collected by a video collecting module;

determining an object as a monitored target based on pre-set scene information and the video data;

extracting characteristic information of the object; and determining predictive information of the object based on the characteristic information, wherein the video data comprises video data including depth information, wherein the pre-set scene information comprises background depth information of a background region of a monitored scene, and wherein the step of determining an object as a monitored target based on pre-set scene information and the video data performed by the computer program instructions when executed by the processor comprises:

obtaining a depth information difference between current depth information of each pixel point of the video data and a corresponding background depth information, and determining a region comprising a pixel point whose depth information difference is greater than a first predetermined threshold as a foreground candidate region; and performing median filtering on video data of the foreground candidate region to obtain video data of a foreground region to be monitored.

18. The video monitoring apparatus according to claim 17, wherein the computer program instructions, when executed by the processor, perform the step of configuring the video collecting module and determining coordinate parameters of the video collecting module, wherein determining coordinate parameters of the video collecting module comprises:

selecting multiple reference points on a predetermined reference plane;

determining a transformation relationship of a camera coordinate system of the video collecting module and a world coordinate system based on coordinate information of the multiple reference points; and determining the coordinate parameters of the video collecting module based on the transformation relationship.

19. The video monitoring apparatus according to claim 18, wherein determining an object as a monitored target performed by the computer program instructions when executed by the processor further comprises:
- removing a noise region where the number of pixel points included is less than a second predetermined threshold from the foreground region to be monitored to obtain a plurality of first foreground sub-regions;
- determining a space between each of the plurality of first foreground sub-regions in a first predetermined direction; and
- connecting respective first foreground sub-regions whose space is smaller than a third predetermined threshold in the first predetermined direction to obtain a plurality of second foreground sub-regions as a plurality of objects.

20. The video monitoring apparatus according to claim 19, wherein extracting characteristic information of the object performed by the computer program instructions when executed by the processor comprises:
- determining a second direction of the object in the monitored scene based on the video data of the object;
- determining a first end point and a second end point of the object in the second direction; and
- determining a length between the first end point and the second end point based on the transformation relationship.

21. The video monitoring apparatus according to claim 20, wherein extracting characteristic information of the object performed by the computer program instructions when executed by the processor further comprises:
- selecting a predetermined point in the object, and tracking motion of the predetermined point based on the video data; and
- determining a motion speed of the predetermined point in the second direction as a motion speed of the object.

22. The video monitoring apparatus according to claim 21, wherein extracting characteristic information of the object performed by the computer program instructions when executed by the processor further comprises:
- selecting multiple predetermined points in the object, and determining an average value of motion speeds of the multiple predetermined points in the second direction as a motion speed of the object; and
- determining the motion speeds of the object at a plurality of predetermined time intervals continuously to obtain a probability distribution of the motion speeds of the object.

23. The video monitoring apparatus according to claim 22, wherein determining predictive information of the object based on the characteristic information performed by the computer program instructions when executed by the processor comprises:
- based on a length and the motion speed of each of the plurality of objects, determining an average waiting time required for moving from the second end point to the first end point as predictive information of each of the plurality of objects.

24. The video monitoring apparatus according to claim 23, wherein determining predictive information of the object based on the characteristic information performed by the computer program instructions when executed by the processor further comprises:
- based on the probability distribution of the motion speeds, subtracting a triple standard deviation of the motion speed by the average value of the motion speed as a slowest motion speed; and
- based on the length and the slowest motion speed of each of the plurality of objects, determining a longest waiting time required for moving from the second end point to the first end point as the predictive information of each of the plurality of objects.

\* \* \* \* \*